US009278458B2

(12) United States Patent
Casagranda et al.

(10) Patent No.: US 9,278,458 B2
(45) Date of Patent: Mar. 8, 2016

(54) FEED UNIT FOR AN AUTOMATIC SAW CUTTING MACHINE FOR CUTTING TUBES IN DOUBLE-TUBE CUTTING MODE

(71) Applicant: ADIGE S.p.A., Levico Terme-Trento (IT)

(72) Inventors: Marco Casagranda, Bedollo (IT); Edoardo Trentin, Bedollo-Trento (IT)

(73) Assignee: ADIGE S.p.A., Trento (IT)

( * ) Notice: Subject to any disclaimer, the term of this patent is extended or adjusted under 35 U.S.C. 154(b) by 0 days.

(21) Appl. No.: 14/288,509

(22) Filed: May 28, 2014

(65) Prior Publication Data
US 2014/0360330 A1    Dec. 11, 2014

(30) Foreign Application Priority Data

Jun. 6, 2013  (IT) .............................. TO2013A0468

(51) Int. Cl.
| | |
|---|---|
| B65G 21/20 | (2006.01) |
| B65D 3/16 | (2006.01) |
| B65G 19/14 | (2006.01) |
| B26D 7/06 | (2006.01) |
| B23D 47/06 | (2006.01) |
| B26D 3/16 | (2006.01) |
| B23Q 5/38 | (2006.01) |
| B27B 25/02 | (2006.01) |
| B27B 25/08 | (2006.01) |

(52) U.S. Cl.
CPC .............. *B26D 7/0625* (2013.01); *B23D 47/06* (2013.01); *B23Q 5/38* (2013.01); *B26D 3/161* (2013.01); *B26D 7/0683* (2013.01); *B27B 25/02* (2013.01); *B27B 25/08* (2013.01); *B65G 21/209* (2013.01); *Y10T 83/6641* (2015.04)

(58) Field of Classification Search
None
See application file for complete search history.

(56) References Cited

U.S. PATENT DOCUMENTS

| 3,855,053 A | 12/1974 | Fuss | |
|---|---|---|---|
| 5,271,304 A * | 12/1993 | Wygal | ..................... B26D 5/22 83/408 |

FOREIGN PATENT DOCUMENTS

| DE | 1481437 | 5/1969 |
|---|---|---|
| DE | 4400038 | 7/1995 |
| EP | 1136198 A2 | 9/2001 |
| EP | 1136198 A3 | 9/2001 |
| JP | 2009056516 | 3/2009 |

OTHER PUBLICATIONS

Italian Search Report; Application No. ITTO20130468; Jan. 28, 2014; The Hague; 8 pages.

\* cited by examiner

*Primary Examiner* — Kavel Singh
(74) *Attorney, Agent, or Firm* — Thomas Horstemeyer, LLP

(57) ABSTRACT

Disclosed are various embodiments depicting a feed unit that comprises: a first pair of motor-driven lower rollers for moving first tubes forward along a first feed axis; a second pair of motor-driven lower rollers for moving second tubes forward along a second feed axis parallel to the first one; a first pair of upper rollers for urging the first tubes against the first pair of lower rollers; a second pair of upper rollers for urging the second tubes against the second pair of lower rollers; a plurality of first side rollers for retaining laterally the first tubes; and a plurality of second side rollers for retaining laterally the second tubes.

8 Claims, 5 Drawing Sheets

FEED UNIT FOR AN AUTOMATIC SAW CUTTING MACHINE FOR CUTTING TUBES IN DOUBLE-TUBE CUTTING MODE

CROSS-REFERENCE TO RELATED APPLICATION

This application claims priority to Italian Patent Application Serial Number TO2013A000468, entitled, "FEED UNIT FOR AN AUTOMATIC SAW CUTTING MACHINE FOR CUTTING TUBES IN DOUBLE-TUBE CUTTING MODE, filed Jun. 6, 2013 which is entirely incorporated herein by reference.

BACKGROUND OF THE INVENTION

The present invention relates in general to an automatic saw cutting machine for cutting tubes in double-tube cutting mode, and more specifically to a roller feed unit for such a machine.

In the description and claims which follow, the term "tube" is used to designate any elongated body having a uniform cross-section along its longitudinal axis, the cross-section being either open or closed. Moreover, the terms "longitudinal" and "transverse" are used to designate the forward direction (or feed direction) of the tubes and any direction lying in a plane perpendicular to the longitudinal direction, respectively.

As is known, a machine of the above-identified type basically comprises a loading unit for loading the tubes to be cut, a roller feed unit for feeding the tubes to the cutting area, a chuck for clamping the tubes during the cutting operation and a cutting head provided with a circular saw for cutting the tubes. The machines currently available on the market can be classified in two main categories: 1) machines arranged to carry out the cutting process in the so called single-tube cutting mode, i.e. to cut one tube at a time; and 2) machines arranged to carry out the cutting process in the so called double-tube cutting mode, i.e. to cut two tubes at a time. The configuration and the operation of the loading unit and of the feed unit of a machine vary in particular depending on the cutting mode that is used in that machine.

The loading unit typically comprises a tube collecting area, a conveying device and a selecting device. The tubes to be cut are collected in the collecting area, with their longitudinal axes parallel to each other, and are moved laterally from that area by means of the conveying device, which comprises for example a set of chains, to the selecting device, in which the tubes are selected two by two.

The feed unit receives the two tubes from the loading unit and feed them to the cutting area, where the two tubes are clamped by the chuck and then cut to size by the circular saw of the cutting head. In the saw cutting machines with roller feed unit, like that of the present invention, the cut length of the two tubes is defined by a respective abutment member against which the tube to be cut is urged until abutment.

FIGS. 1 and 2 of the attached drawings schematically show a transverse section view (i.e. a section view through a section plane perpendicular to the longitudinal axis of the tubes to be cut) and a side view, respectively, of a known example of a roller feed unit for a saw cutting machine for cutting tubes in double-tube cutting mode. With reference to FIGS. 1 and 2, the feed unit is generally indicated 10 and comprises first of all a first pair of lower rollers 12a, 12b, that is to say, an upstream lower roller and a downstream lower roller (wherein the terms "upstream" and "downstream" are referred to the forward direction of the tubes, indicated by arrow F), respectively, that are associated to a first tube feed line (left-hand line, with respect to the point of view of a person looking at FIG. 1), the axis of which is indicated x1, and a second pair of lower rollers 14a, 14b, that is to say, an upstream lower roller and a downstream lower roller, respectively, that are associated to a second tube feed line (right-hand line, with respect to the point of view of a person looking at FIG. 1), the axis of which is indicated x2. The upstream lower rollers 12a, 14a are rotatably mounted about the same transverse axis of rotation $y_a$, in particular a horizontal axis of rotation. Likewise, the downstream lower rollers 12b, 14b are rotatably mounted about the same transverse axis of rotation $y_b$, in particular a horizontal axis of rotation, hence parallel to the axis of rotation $y_a$ of the upstream lower rollers. The lower rollers 12a, 12b, 14a, 14b are all motor-driven rollers and therefore will also be referred to hereinafter as driving rollers.

The feed unit 10 of FIGS. 1 and 2 further comprises a first pair of upper rollers 16a, 16b, that is to say, an upstream upper roller and a downstream upper roller, respectively, that are associated to the first tube feed line (axis x1), and a second pair of upper rollers 18a, 18b, that is to say, an upstream upper roller and a downstream upper roller, respectively, that are associated to the second tube feed line (axis x2). Like the lower rollers, the upstream upper rollers 16a, 18a are rotatably mounted about the same transverse axis of rotation $y'_a$, in particular a horizontal axis of rotation, and the downstream upper rollers 16b, 18b are also rotatably mounted about the same transverse axis of rotation $y'_b$, in particular a horizontal axis of rotation, which is therefore parallel to the axis of rotation $y'_a$ of the upstream upper rollers. The upper rollers 16a, 16b, 18a, 18b may either be idly mounted about the respective axes of rotation or be motor-driven. Moreover, the upper rollers 16a, 16b, 18a, 18b are vertically movable, for example by means of a rocking support 20, to be urged each towards a respective lower roller 12a, 12b, 14a, 14b with a given preload (that can be adjusted for each upper roller independently of the other rollers), in order to ensure that each tube (indicated T1 for the first feed line and T2 for the second feed line) is clamped with a given clamping force between a lower roller and an upper roller. Therefore, the upper rollers will also be referred to hereinafter as pressing rollers.

The feed unit 10 of FIGS. 1 and 2 further comprises side retaining rollers, that are idly mounted about respective vertical axes of rotation, namely a series of first side rollers 22 (only shown in FIG. 1) adapted to retain laterally the tube(s) along the first feed line (axis x1), a series of second side rollers 24 (only shown in FIG. 1) adapted to retain laterally the tube(s) along the second feed line (axis x2) and a series of intermediate rollers 26 that are interposed between the two lines of tubes T1 and T2 that are fed to the cutting area.

In a known feed unit for an automatic saw cutting machine for cutting tubes in double-tube cutting mode, like the one described above with reference to FIGS. 1 and 2, the two feed lines are plainly distinct from each other, since the tubes on the two feed lines are always kept at a distance from each other by means of the intermediate rollers.

SUMMARY OF THE INVENTION

It is an object of the present invention to provide a feed unit for an automatic saw cutting machine for cutting tubes in double-tube cutting mode that is structurally simpler and less expensive than the prior art described above.

This and other objects are fully achieved according to the present invention by virtue of a feed unit having the features set forth in the enclosed independent claim 1.

BRIEF DESCRIPTION OF THE DRAWINGS

Advantageous embodiments of the feed unit according to the invention form the subject-matter of the dependent claims, the content of which is to be regarded as an integral and integrating part of the following description.

The features and the advantages of the invention will clearly result from the following detailed description, given purely by way of non-limiting example with reference to the appended drawings, in which.

DETAILED DESCRIPTION OF THE PREFERRED EMBODIMENTS

Figure 1:
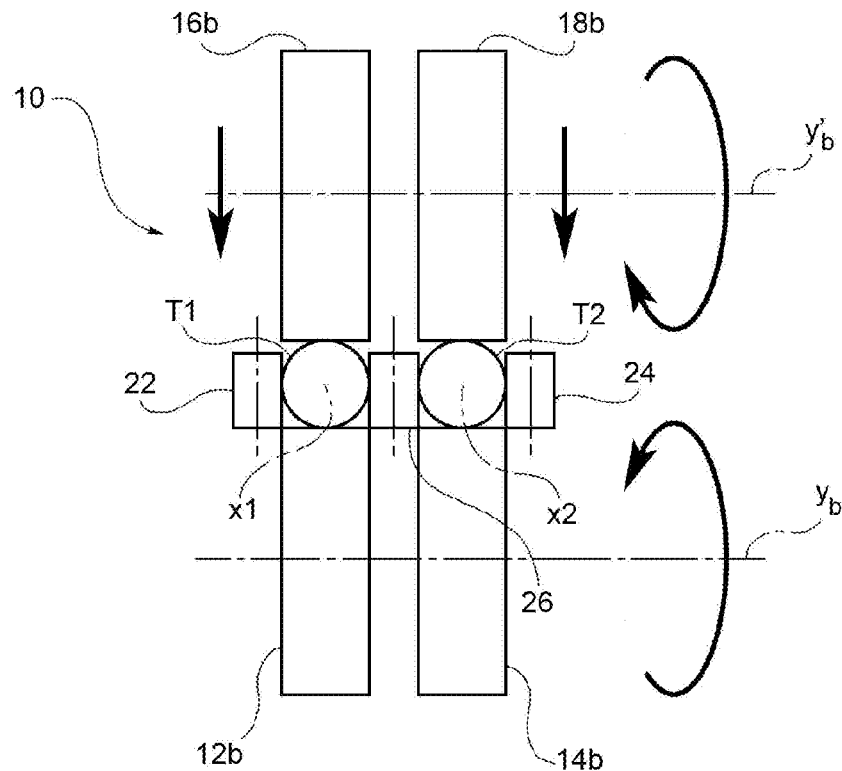
FIGS. 1 and 2 show schematically a transverse section view and a side view, respectively, of a roller feed unit for a saw cutting machine for cutting tubes in double-tube cutting mode according to the prior art.
Figure 2:
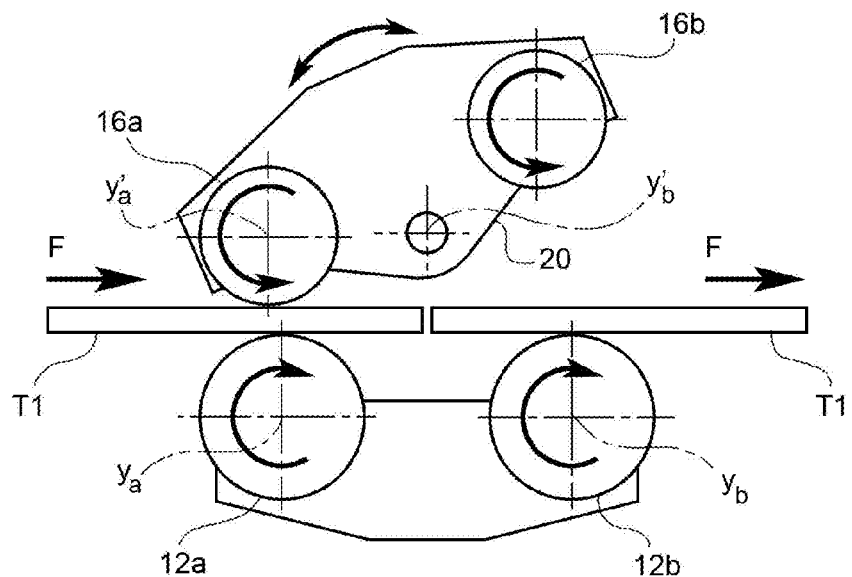

With reference to FIGS. 3 to 7, where parts and elements identical or corresponding to those of FIGS. 1 and 2 have been given the same reference numerals, a roller feed unit (hereinafter simply referred to as "feed unit") for a saw cutting machine for cutting tubes in double-tube cutting mode (hereinafter simply referred to as "saw cutting machine") is generally indicated 10.

The feed unit 10 comprises a first pair of lower rollers, or driving rollers, 12a, 12b which are adapted to move first tubes (indicated T1) forward along a first feed axis x1 and are located upstream and downstream, respectively, with respect to the forward direction (indicated by arrow F) of the tubes.

The feed unit 10 further comprises a second pair of lower rollers, or driving rollers, 14a, 14b, which are adapted to move second tubes (indicated T2) forward along a second feed axis x2 parallel to the first feed axis x1 and are located upstream and downstream, respectively, with respect to the forward direction F of the tubes.

The upstream lower rollers 12a, 14a are rotatably mounted about the same transverse axis of rotation $y_a$, in particular an axis of rotation inclined by an angle $\alpha$ (shown in FIGS. 3 and 7) to the horizontal. The angle of inclination $\alpha$ is an acute angle and will be typically comprised between 0° and 60° (limits included), preferably equal to 30° approximately. Likewise, the downstream lower rollers 12b, 14b are rotatably mounted about the same transverse axis of rotation $y_b$, which is inclined by the same angle of inclination $\alpha$ to the horizontal.

The lower rollers 12a, 12b, 14a, 14b are all motor-driven rollers. Preferably, these rollers are operated at the same time by a single motor 28, which may be for example a hydraulic motor or an electric motor.

Although in the embodiment proposed herein two distinct upstream lower rollers 12a, 14a are provided for, these rollers might also be made as a single piece. When the two upstream lower rollers 12a, 14a are made as separate parts, it is however advantageous to connect these rollers to each other in such a manner that they rotate as a single body about the transverse axis of rotation $y_a$. The same applies to the downstream lower rollers 12b, 14b. Although in the embodiment proposed herein two distinct downstream lower rollers 12b, 14b are provided for, these rollers might also be made as a single piece. When the two downstream lower rollers 12b, 14b are made as separate parts, it is however advantageous to connect these rollers to each other in such a manner that they rotate as a single body about the transverse axis of rotation $y_b$.

The feed unit 10 further comprises a first pair of upper rollers, or pressing rollers, 16a, 16b, which are located upstream and downstream, respectively, with respect to the forward direction F of the tubes and are associated to the first feed axis x1, and a second pair of upper rollers 18a, 18b, which are located upstream and downstream, respectively, with respect to the forward direction F of the tubes and are associated to the second feed axis x2. Like the lower rollers, the upstream upper rollers 16a, 18a are rotatably mounted about the same transverse axis of rotation $y'_a$, in particular an axis of rotation inclined by the aforesaid angle of inclination $\alpha$ to the horizontal, and the downstream upper rollers 16b, 18b are also rotatably mounted about the same transverse axis of rotation $y'_b$, inclined by the same angle of inclination $\alpha$ to the horizontal.

The upper rollers 16a, 16b, 18a, 18b are idly mounted about the respective axes of rotation. Moreover, each upper roller 16a, 16b, 18a, 18b is movable towards a respective lower roller 12a, 12b, 14a, 14b with a given preload (which can be adjusted for each upper roller independently of the other rollers), so as to ensure that each tube is clamped with a given clamping force between a lower roller and an upper roller. In this connection, the upstream upper rollers 16a, 18a are supported by a respective support body 30a, which can be moved relative to the upstream lower rollers 12a, 14a, along the direction joining the axes of rotation $y_a$ and $y'_a$ of these rollers, by means of a respective linear actuation device 32a, made for example as a hydraulic actuation device. Likewise, the downstream upper rollers 16b, 18b are supported by a respective support body 30b, which can be moved relative to the downstream lower rollers 12b, 14b, along the direction joining the axes of rotation $y_b$ and $y'_b$ of these rollers, by means of a respective linear actuation device 32b, which is also made for example as a hydraulic actuation device and is operable independently of the linear actuation device 32a.

Figure 7:
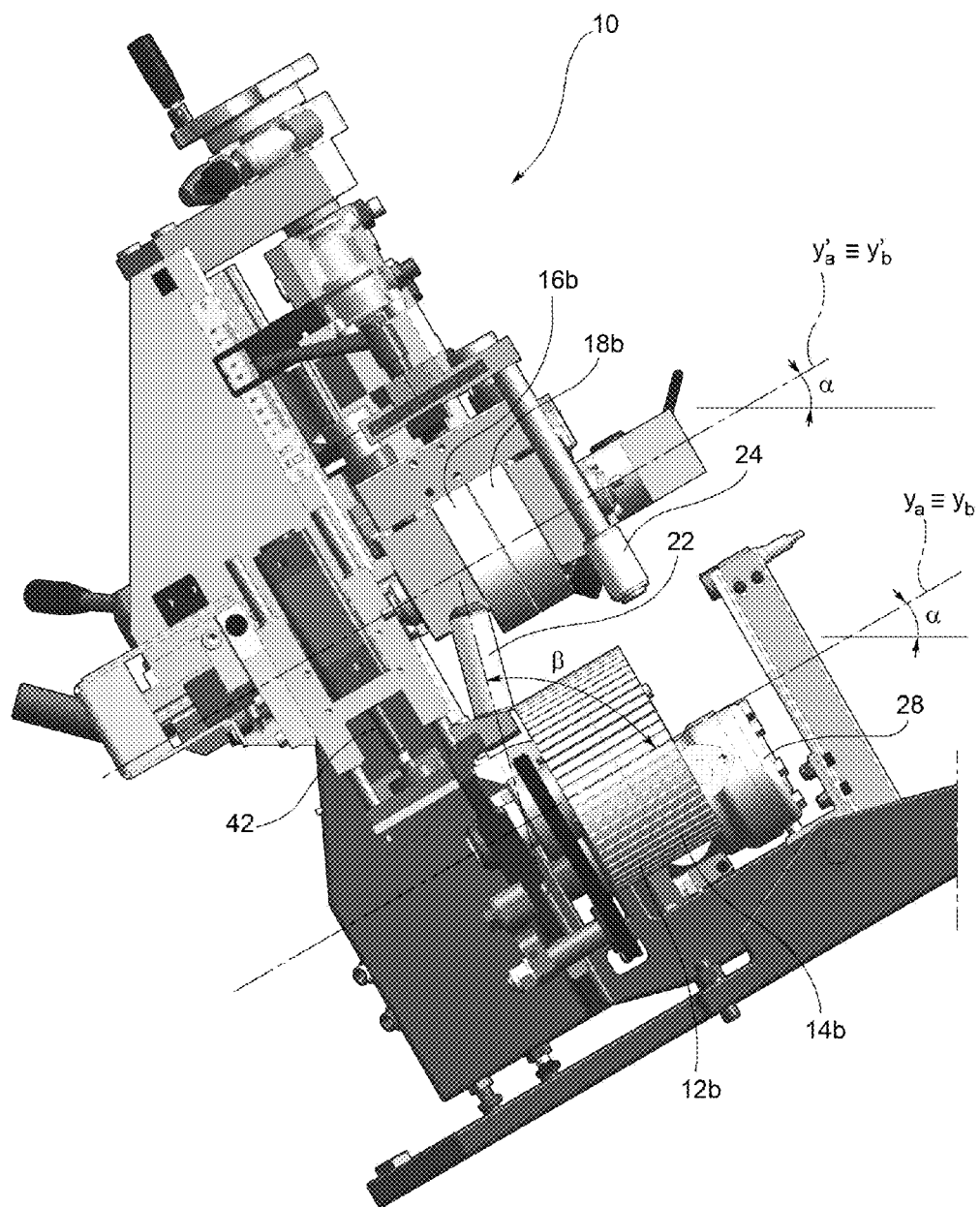
FIG. 7 is a front elevation view of the feed unit of FIGS. 5 and 6.

The feed unit 10 further comprises a series of first side rollers 22 for laterally retaining the tubes T1 that are being moved forward along the first feed axis x1 and a series of second side rollers 24 for laterally retaining the tubes T2 that are being moved forward along the second feed axis x2. Both the side rollers 22 and the side rollers 24 are idly mounted each about the respective axis of rotation. As can be seen in FIG. 7, the first side rollers 22 are mounted on the stationary portion of the feed unit 10 and are oriented with their own axes of rotation inclined by an angle $\beta$ comprised between 45° and 90° (limits included), preferably an angle equal to 75°, to the plane passing through the axes of rotation $y_a$ and $y_b$ of the lower rollers 12a, 12b, 14a, 14b. As far as the second side rollers 24 are concerned, a number of them are supported by the support body 30a so as to be movable with this latter along the direction joining the axes of rotation $y_a$ and $y'_a$ of the upstream rollers 12a, 14a, 16a, 18a, whereas the remaining ones are mounted on the stationary portion of the feed unit 10. In the example illustrated in FIGS. 5 to 7, there are four first side rollers 22 and two second side rollers 24, one of which is supported by the support body 30a while the other is supported by the stationary portion of the feed unit 10, but the number of side rollers may of course be different from the one illustrated herein.

As can be easily noticed from FIG. 7, by virtue of the inclined orientation of the axes of rotation $y_a$ and $y_b$ of the lower rollers, the two tubes T1 and T2 that are being loaded each time by means of the loading device (not shown) of the saw cutting machine are initially in contact with each other and move in the forward direction F remaining in contact with each other, clamped at the bottom by the lower rollers 12*a*, 12*b*, 14*a*, 14*b*, at the top by the upper rollers 16*a*, 16*b*, 18*a*, 18*b* and laterally by the first side rollers 22 and the second side rollers 24.

The feed unit 10 further comprises a separating element 34, which is made in particular as a thin sheet- or plate-like element and is longitudinally interposed between the upstream lower rollers 12*a*, 14*a* and the downstream lower rollers 12*b*, 14*b* and transversely interposed between the two tube feed axes x1 and x2. More specifically, the separating element 34 is arranged with its own middle plane perpendicular to the plane passing through the axes x1 and x2 (which will be also referred to hereinafter as slide plane and coincides with the plane passing through the axes of rotation $y_a$ and $y_b$ of the lower rollers 12*a*, 12*b*, 14*a*, 14*b*) and at the same distance therefrom, as shown in FIG. 3.

The separating element 34 is operable by means of a respective actuation device 42 to be alternatively moved between a rest position (FIG. 4), in which it is placed wholly below the slide plane and hence not interposed between the tubes that are being moved forward simultaneously towards the cutting area along the two feed axes, and a working position (FIG. 3), in which it is instead interposed between the tubes that are being moved forward simultaneously towards the cutting area along the two feed axes, thus preventing these tubes from being in contact—as would normally occur—with each other.

Figure 3:
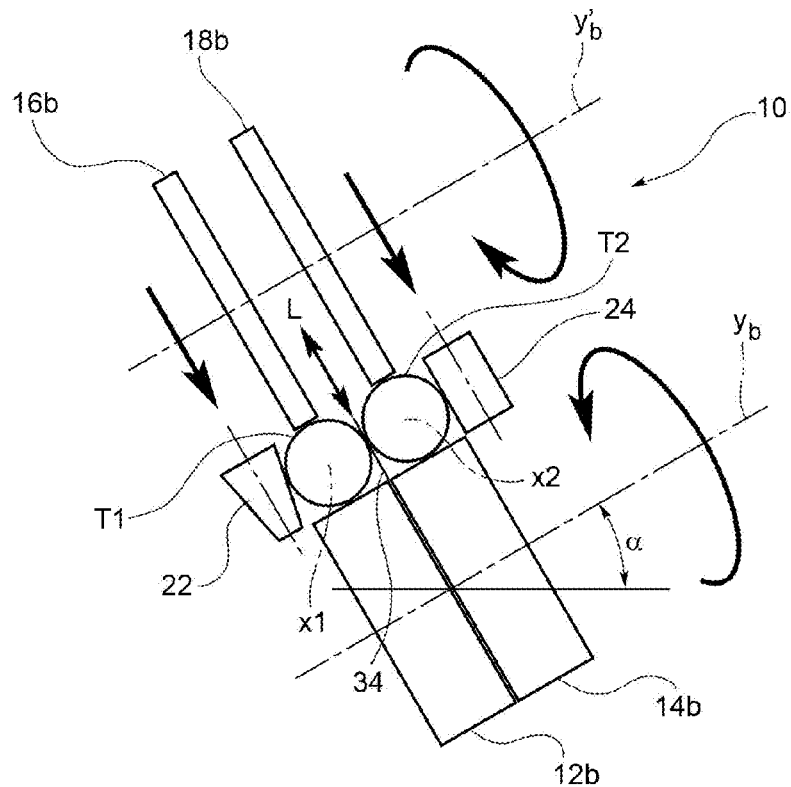
FIGS. 3 and 4 show schematically a transverse section view and a side view, respectively, of a roller feed unit for a saw cutting machine for cutting tubes in double-tube cutting mode according to an embodiment of the present invention.
Figure 4:
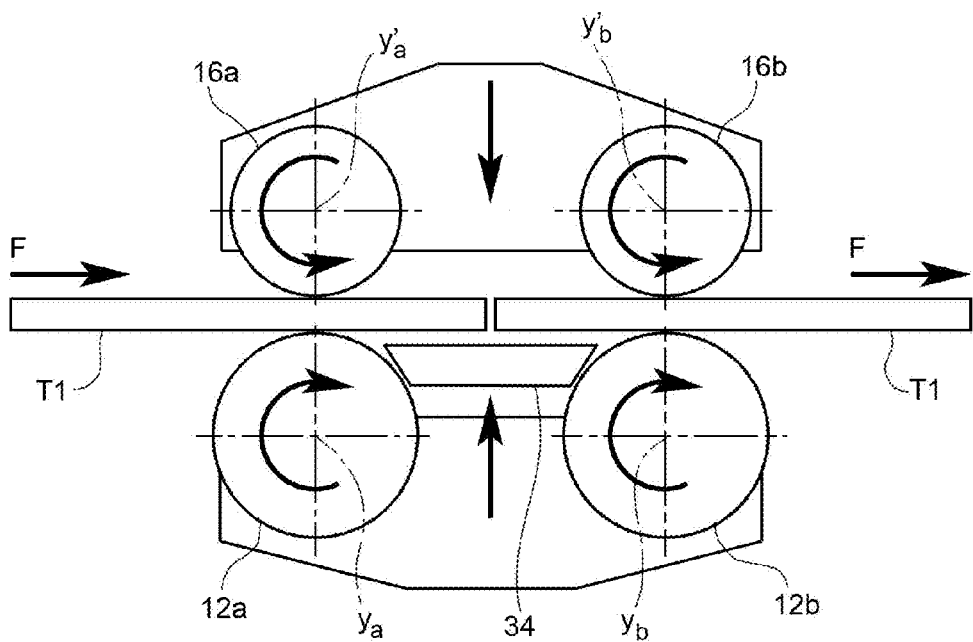
Figure 5:
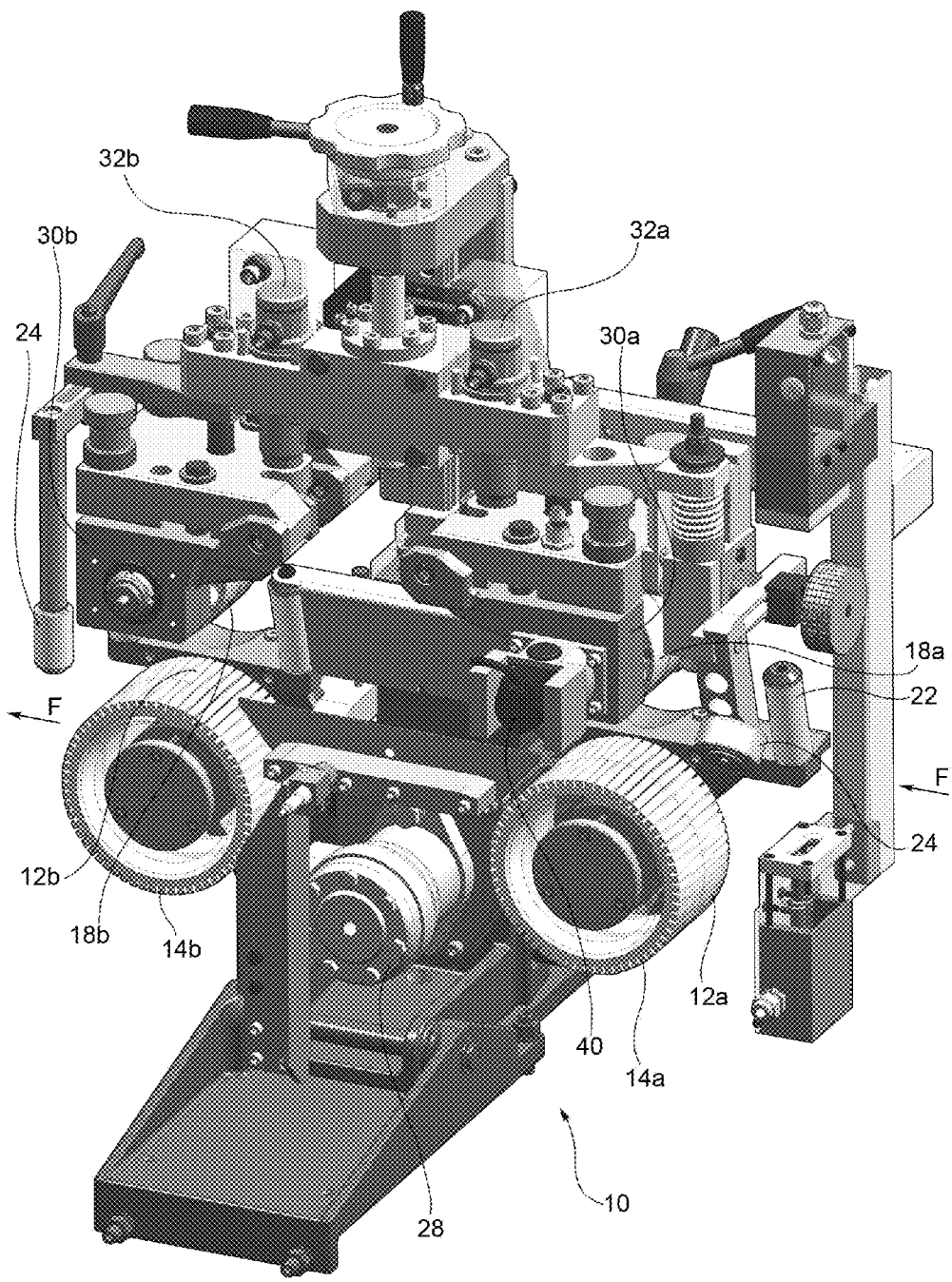
FIGS. 5 and 6 are perspective views, from two different points of view, of a roller feed unit for a saw cutting machine for cutting tubes in double-tube cutting mode according to an embodiment of the present invention.
Figure 6:
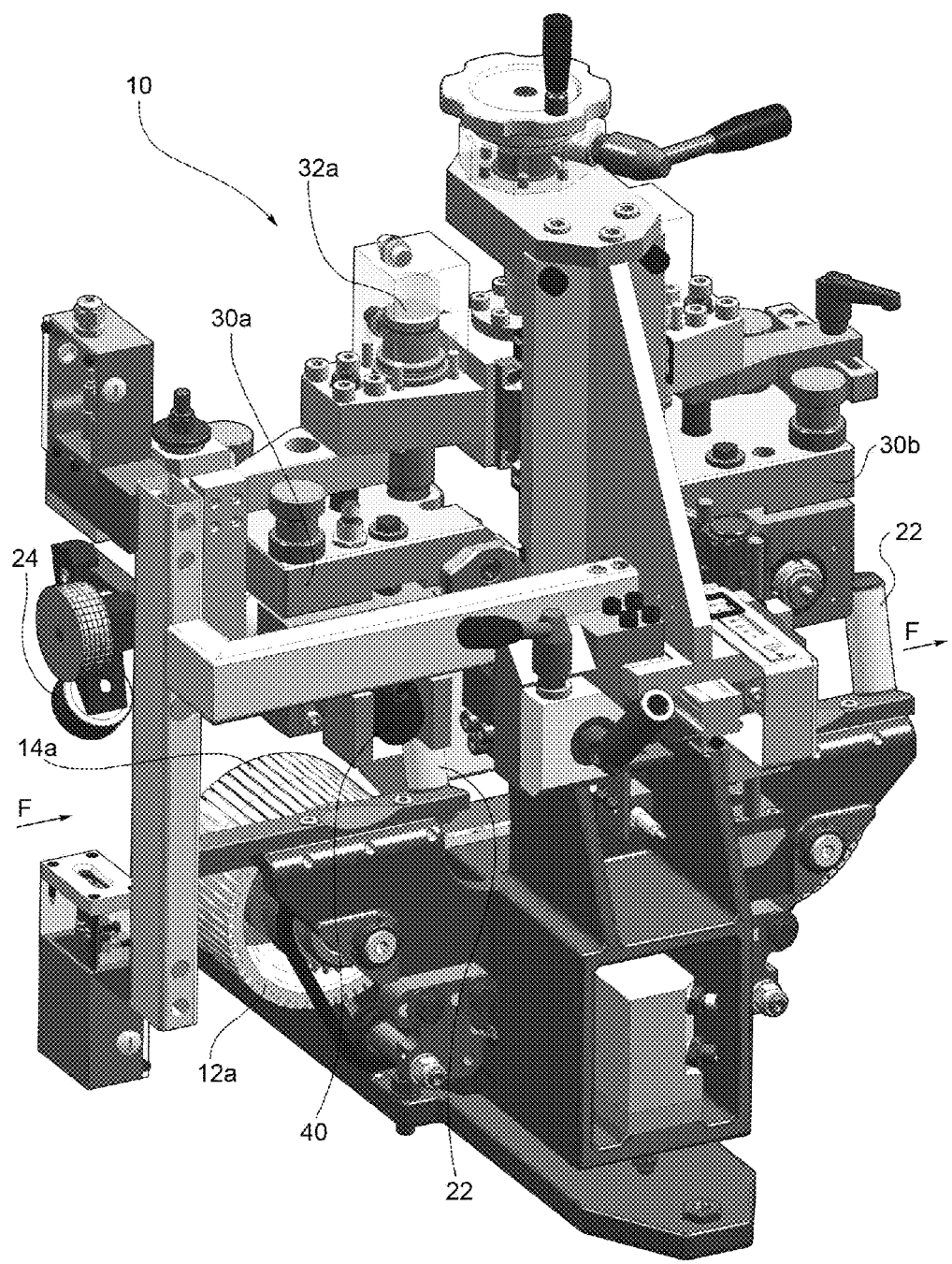

According to an embodiment of the invention, the actuation device 42 associated to the separating element 34 is a linear actuation device, such as a pneumatic cylinder, and more specifically a linear actuation device adapted to control the movement of the separating element in a direction perpendicular to the slide plane (direction indicated by double arrow L in FIG. 3).

The separating element 34 is moved from the rest position to the working position defined above for a short time during the tube change phase under control of an electronic control unit which governs the operation of the machine. In the normal operation of the machine, the two tubes T1 and T2 to be cut are each in contact with both the respective upstream and downstream driving rollers (rollers 12*a*, 12*b* for the tube T1 and rollers 14*a*, 14*b* for the tube T2) and are moved forward simultaneously by these rollers each time by a distance sufficient to bring each tube into abutment against an abutment member suitably positioned so as to define the desired cut length. The tube change phase takes place when the two tubes T1 and T2 that are being worked (hereinafter referred to as "old tubes") are about to be finished and at a certain time loose contact with the upstream rollers (both the motor-driven rollers 12*a*, 14*a* and the pressing rollers 16*a*, 18*a*), so that they are driven from that time by the downstream driving rollers 12*b*, 14*b* only.

In this regard, in the present embodiment the loss-of-contact condition, i.e. the fact that the tubes that are being worked loose contact with the upstream rollers, is detected by means of rotary sensors 40 (FIGS. 5 and 6) associated to the upstream pressing rollers 16*a*, 18*a*, as well as by means of two photocells or similar optical detection devices (that are not shown in the drawings, but are anyway of per-se-known type), each of which is placed upstream of the upstream rollers of a respective tube feed axis. Other ways for detecting the fact that the tubes under working have lost contact with the upstream rollers can of course be envisaged and are all regarded as falling within the scope of the present invention.

Once the loss-of-contact condition has been detected, the machine automatically loads two new tubes by means of the loading device described in the introductory part of the present description. In order to allow each of the two new tubes to be inserted between the respective upstream driving roller 12*a*, 14*a* and the respective upstream pressing roller 16*a*, 18*a* of the feed unit 10, the upstream pressing rollers 16*a*, 18*a* are moved away from the associated upstream driving rollers 12*a*, 14*a* by suitable movement of the support body 30*a* by means of the respective linear actuation device 32*a*.

The new tubes loaded in the feed unit 10 will be each at a certain distance from the old tube along the same feed axis. In order to ensure that the machine is working properly, in particular that the required cut tolerances are met, each new tube must be brought in contact with the old tube along the same feed axis. This is obtained by clamping the old tubes by means of the chuck and by moving the new tubes forward by means of the upstream driving rollers 12*a*, 14*a*, until the new tubes abut against the respective old tubes.

The separating element 34 is moved into the working position as soon as the two new tubes have been loaded, thus being interposed between these tubes, and is kept in this position until the new tubes have been brought into abutment each with the old tube along the same feed axis. With the separating element 34 in the working position, the two new tubes are separated from each other and can therefore be moved forward, without the risk that they interfere with each other, to be brought into abutment each against the old tube along the same feed axis. Once the condition of abutment between the new and old tubes has been detected, for example by means of the above-mentioned rotary sensors 40, the separating element 34 is brought back into the rest position and the tubes along the two feed axes return in contact with each other.

The two photocells (or the similar optical detection devices) mentioned above are used, along with the rotary sensors 40, to establish the difference in the longitudinal position between the two tubes that are being fed simultaneously to the cutting area. More specifically, when either of the photocells does not detect the presence of the tube anymore, since the end portion of the tube has passed beyond the longitudinal position checked by that photocell, the electronic control unit of the machine stores the measure given at that time by the rotary sensor mounted on the corresponding upstream pressing roller (16*a* or 18*a*). The same takes place with the other photocell and with the other rotary sensor, in that the electronic control unit of the machine stores the measure given by that rotary sensor at the time when the associated photocell does not detect the end portion of the tube anymore.

The two measures thus stored are compared with each other to establish the relative longitudinal position of the two tubes and to control, on the basis of this position, the tube feeding operation and the tube trimming operation.

As will clearly result from the above description, a feed unit for an automatic saw cutting machine for cutting tubes in double-tube cutting mode according to the present invention offers the advantage of being structurally less complicated, and hence less expensive, than the prior art discussed in the introductory part of the description. Instead of having two tube feed lines totally independent of each other, with the tubes always kept separated from each other by the intermediate rollers, the feed unit according to the present invention works, in fact, like a single-tube feed unit, as it moves the two tubes forward simultaneously on pairs of driving rollers inclined to the horizontal and keeps the two tubes separated from each other by means of the separating element only during the tube change phases. A further advantage that is obtained with the use of a feed unit according to the present invention is that less time is required to set up the machine, as the number of parts that have to be replaced to adapt the machine to a different diameter of the tubes to be cut is smaller.

Naturally, the principle of the invention remaining unchanged, the embodiments and the constructional details may be greatly modified with respect to those described and illustrated purely by way of a non-limiting example.

For example, although the invention is described and illustrated herein with reference to an embodiment in which the angle of inclination of the axes of rotation of the lower and upper rollers, and hence of the slide plane, to the horizontal is an angle larger than 0°, in particular an angle approximately equal to 30°, this angle might also be equal to 0°. In this case, since the weight force acting on the tubes does not have a component that is oriented parallel to the slide plane and that can therefore keep the tubes moving forward along the two feed axes x1 and x2 in contact with each other, the contact between the tubes will be ensured by suitable configuration of the side rollers.

What is claimed is:

1. A feed unit for an automatic saw cutting machine for cutting tubes in double-tube cutting mode, the feed unit comprising
    a first pair of motor-driven lower rollers, that is to say, an upstream lower roller and a downstream lower roller, respectively, for moving first tubes forward along a first feed axis,
    a second pair of motor-driven lower rollers, that is to say, an upstream lower roller and a downstream lower roller, respectively, for moving second tubes forward along a second feed axis parallel to the first feed axis,
    a first pair of upper rollers, that is to say, an upstream upper roller and a downstream upper roller, respectively, for urging said first tubes against said first pair of lower rollers,
    a second pair of upper rollers, that is to say, an upstream upper roller and a down-stream upper roller, respectively, for urging said second tubes against said second pair of lower rollers,
    a plurality of first side rollers for retaining laterally said first tubes, and
    a plurality of second side rollers for retaining laterally said second tubes,
    wherein the upstream rollers of said first pair of lower rollers and of said second pair of lower rollers are rotatably mounted about a first transverse axis of rotation,
    wherein the downstream rollers of said first pair of lower rollers and of said second pair of lower rollers are rotatably mounted about a second transverse axis of rotation parallel to said first transverse axis of rotation,
    wherein the upstream rollers of said first pair of upper rollers and of said second pair of upper rollers are rotatably mounted about a third transverse axis of rotation parallel to said first transverse axis of rotation,
    wherein the downstream rollers of said first pair of upper rollers and of said second pair of upper rollers are rotatably mounted about a fourth transverse axis of rotation parallel to said first transverse axis of rotation, and
    wherein each upper roller is adapted to be moved towards a respective lower roller to clamp a respective tube against said lower roller,
    characterized in that said first transverse axis of rotation is inclined by an angle of inclination ($\alpha$) between 0° and 60°, limits included, to the horizontal, and in that it further comprises a separating element alternatively movable between a rest position, in which it is wholly placed below the plane passing through said first and second feed axes and therefore it is not interposed between said first and second tubes, whereby said first and second tubes are in contact with each other, and a working position, in which it is placed between said first and second tubes so as to prevent these tubes from being in contact with each other.

2. A feed unit according to claim 1, wherein the separating element is a thin sheet- or plate-like element arranged with its middle plane perpendicular to the plane passing through said first and second feed axes and at the same distance from said first and second feed axes.

3. A feed unit according to claim 1, further comprising a linear actuation device for controlling the movement of the separating element between said rest and working positions along a direction perpendicular to the plane passing through said first and second feed axes.

4. A feed unit according to claim 1, further comprising a single motor for rotating at the same time said first pair of lower rollers and said second pair of lower rollers about the respective axes of rotation.

5. A feed unit according to claim 1, wherein the upstream rollers of said first pair of lower rollers and of said second pair of lower rollers and/or the downstream rollers of said first pair of lower rollers and of said second pair of lower rollers are made in a single piece.

6. A feed unit according to claim 1, wherein said first pair of upper rollers and/or said second pair of upper rollers are idly mounted about the respective axes of rotation.

7. A feed unit according to claim 1, wherein said angle of inclination ($\alpha$) is between 15° and 45°, limits included.

8. A feed unit according to claim 1, wherein said first side rollers are oriented with their axes of rotation inclined to the plane passing through said first and second axes of rotation by an angle ($\beta$) between 45° and 90°, limits included.

* * * * *